US005497000A

United States Patent [19]
Tao et al.

[11] Patent Number: 5,497,000
[45] Date of Patent: Mar. 5, 1996

[54] METHOD OF ELECTROCHEMICAL DETECTION/IDENTIFICATION OF SINGLE ORGANIC MOLECULES USING SCANNING TUNNELING MICROSCOPY

[75] Inventors: Nongjian Tao, Miami, Fla.; Stuart M. Lindsay, Tempe, Ariz.

[73] Assignee: The United States of America as represented by the Secretary of the Navy, Washington, D.C.

[21] Appl. No.: 187,028

[22] Filed: Jan. 27, 1994

[51] Int. Cl.⁶ ................................................. H01J 37/00
[52] U.S. Cl. ............................................................ 250/307
[58] Field of Search ...................................... 250/306, 307

[56] References Cited

U.S. PATENT DOCUMENTS

| | | | |
|---|---|---|---|
| 4,868,396 | 9/1989 | Lindsay | 250/306 |
| 4,969,978 | 11/1990 | Tomita et al. | 250/307 |
| 5,106,729 | 4/1992 | Lindsay et al. | 250/307 |
| 5,155,361 | 10/1992 | Lindsay | 250/307 |
| 5,270,214 | 12/1993 | Sessler | 436/94 |
| 5,372,930 | 12/1994 | Colton et al. | 250/306 |

*Primary Examiner*—Bruce C. Anderson
*Attorney, Agent, or Firm*—William F. McCarthy; Thomas E. McDonald; John G. Wynn

[57] ABSTRACT

A method of detecting/identifying organic molecules which have been mixed with an appropriate electrolyte to form an electrolytic solution is disclosed. The organic molecules to be detected/identified are adsorbed onto the surface of a conducting substrate, which is adjusted to an overall positive voltage potential within a range of $E_{LOW}$ and $E_{HIGH}$. The voltage potential on the surface of the conducting substrate, and, accordingly, the adsorbed organic molecules, is adjusted until an electrochemically-induced change occurs. The voltage potential at which the change occurs is characteristic of the organic molecule, thus permitting detection/identification thereof. Because the contrast of photomicrographic images generated concurrently by an associated scanning tunneling microscope is remarkably sensitive to the changes in the foregoing voltage potentials, the electrochemical ability to detect/identify organic molecules is extended to a single molecule by the combination of electrochemical and scanning tunneling microscopy techniques, according to the present invention.

15 Claims, 4 Drawing Sheets

METHOD OF ELECTROCHEMICAL DETECTION/IDENTIFICATION OF SINGLE ORGANIC MOLECULES USING SCANNING TUNNELING MICROSCOPY

BACKGROUND OF THE INVENTION

1. Field of the Invention

The present invention relates generally to a method of detecting/identifying organic molecules using electrochemistry and scanning tunneling microscopy, but more particularly to the electrochemically-induced change detection/identification, in situ, of single organic molecules after having been adsorbed on a conducting substrate, e.g., gold or graphite, by use of a scanning tunneling microscope.

2. Description of the Prior Art

It is well known that the scanning tunneling microscope (STM) can be used to identify electronic states on the surfaces of metal or other conducting substrates in an ultrahigh vacuum. The reason for this is that the amount of tunnel current that flows, in otherwise fixed conditions, is a direct measure of the density of electronic states near the Fermi level at the surfaces of the metal or other conducting substrates. As the voltage applied (bias) between the tip of the STM and the surface of a particular metal or other conducting substrate is changed, the energy of the tunneling electrons changes with respect to the energy of the fixed electronic states on the surface, if the bias is applied so that electrons tunnel into the surface. Localized electronic states cause the contrast on the surface of the metal or other conducting substrate to be enhanced as imaged by the STM. The absorption of atoms or molecules onto the surface of the metal or other conducting substrate can, also, give rise to localized surface states which produce features in the STM image which depend on the bias, aforementioned. Spontaneous and charge-induced formation of monolayers of adsorbates of organic molecules on solid surfaces have been widely studied. The STM makes molecular resolution of these adsorbates possible for the first time. As previously mentioned, the STM has been used to study organic adsorbates on metal or other conducting surfaces in an ultrahigh vacuum. In addition, it has been used to image these adsorbates in liquids and in ambient conditions in air. Rather special conditions, however, are required to image such adsorbates, particularly outside an ultrahigh vacuum environment. The organic molecules must form a stable layer which resists the forces encountered in scanning tunneling microscopy while all contamination must be so weakly bound that it is not imaged. Liquid crystals often satisfy these criteria, particularly when the imaging is carried out in a protective layer of the liquid phase. Another approach is to carry out a chemical reaction which binds the molecules to the substrate. This approach relies on the strong STM tip to substrate interaction to ""sweep"" unwanted molecules away. In general, these methods are quite difficult to carry out in a reproducible way. Even if the adsorbates remain stable, it is highly unlikely that the tip of the associated STM will do so in an uncontrolled environment.

In the more recent past, certain prior art electrochemical methods for control of molecular adsorbates for STM imaging have been explored. The adsorption of organic molecules onto the surface of a metal or other conducting substrate in an ultrahigh vacuum is a very difficult process to control with any specificity and repeatability. Moreover, when the adsorbates are biological molecules, i.e., large organic molecules, control is even more difficult. Hence, methods incorporating ultrahigh vacuum are deemed, as cataloged in the prior art, unsuitable for the analysis of biological molecules.

Consequently, there is a need in the prior art to overcome the foregoing limitations by developing an electrochemically-induced charge method of depositing and holding organic molecules onto the surface of a metal or other conducting substrate where they can be imaged, analyzed and detected/identified, wherein the detection/identification is extended to a single molecule, in situ, by use, inter alia, in combination, of an associated STM.

The prior art, as indicated hereinabove, teach some advances in methods of detecting/identifying organic molecules. Insofar as can be determined, however, no prior art method teaches the detection/identification in an ambient environment (rather than in a vacuum) of a single organic molecule, nor incorporates all of the other features and advantages of the present invention.

OBJECTS OF THE INVENTION

Accordingly, a principal object of the present invention is to create a method of detecting/identifying organic molecules in an improved manner.

A corollary object of the above object is to extend the method of detecting/identifying to a single one of the organic molecules by combining electrochemically-induced charge and scanning tunneling microscopy data in an improved manner.

A corollary object of the above object is to control the deposition of the organic molecules onto the surface of a conducting substrate so as to create a monolayer(s) or less of adsorbed organic molecules.

An important object is to create the method so as to identify the single organic molecule in a liquid environment in ambient air rather than in an ultrahigh vacuum, thus, eliminating all of the problems associated therewith.

A corollary object of all of the previous objects is to observe the electrochemistry under the same conditions in which the STM imaging is carried out in an improved manner.

SUMMARY OF THE INVENTION

In accordance with the foregoing stated objects, other objects, features and advantages, the present invention has as a primary purpose to create a method to identify a single molecule of certain organic molecules of which monolayers thereof have been adsorbed onto the surface of a metal or other conducting substrate by combining electrochemically-induced charge and STM observed data in an improved manner.

The essence of the present method is in being able to detect/identify a single one of the certain organic molecules adsorbed onto the metal or other conducting substrate, i.e., only a single molecule has to be adsorbed on the substrate in order for an identification thereof to be made.

The purpose of the present method is carried out by sealably affixing a conducting substrate, e.g., epitaxially grown gold on mica or freshly cleaved highly oriented pyrolytic graphite, so as to be a part of an electrochemical cell having a platinum counter electrode and a silver wire reference electrode. The organic molecules to be deposited, i.e., adsorbed onto the conducting substrate, are prepared as part of an electrolytic solution, which is loaded into the electrochemical cell so as to completely cover the surface of the conducting substrate. Coverage of the surface of the conducting substrate is controlled, inter alia, by adjusting the concentration of the organic molecules in the electrolytic solution and the voltage potential on the surface of the conducting substrate. Now, in a first step, the organic molecules (to be detected and identified) in the electrolytic solution are adsorbed onto the surface of the conducting substrate by adjusting and then holding the surface for a predetermined time to an overall predetermined positive voltage potential. The predetermined time that the surface is held to the predetermined positive voltage potential is less than a second, and, as mentioned above, is dependent on the concentration of the electrolytic solution. In a second step, the surface potential of the conducting substrate, I. e., the voltage potential between it and a reference electrode, is then adjusted, until an electrochemically-induced change occurs within the adsorbed organic molecules. The electrochemically-induced change may be an electron transfer reaction or a structural transition (or both). The voltage potential at which this occurs is characteristic of the adsorbed organic molecules, thus, permitting identification thereof. In a concurrent second step, photomicrographic images, to a resolution of a single organic molecule and/or conducting substrate molecule, are generated of the surface of the conducting substrate, and, accordingly, the adsorbed organic molecules by an associated scanning tunneling microscope. Since the contrast of these photomicrographic images are sensitive to the aforementioned electrochemically-induced changes (an unexpected result), the electrochemical ability to identify the organic molecules is extended to a single organic molecule by the combination of electrochemical and scanning tunneling microscopy techniques, according to the present invention.

BRIEF DESCRIPTION OF THE DRAWINGS

The previously stated objects, other objects, features and advantages of the method according to the present invention will become more apparent from the following more particular description of the preferred embodiment taken in connection with the accompanying drawings, in which.

DESCRIPTION OF THE PREFERRED EMBODIMENT

The method of the present invention beneficially combines certain electrochemical and scanning tunneling microscopy techniques in a concurrent fashion so as be able to detect and identify a single organic molecule in situ. Being able to detect and identify a single organic molecule would be of great importance in the field of chemical sensing. One application would be in identifying trace amounts of contamination in water. Another application would be in identifying trace amounts of organic molecules on a conducting surface such as a doped semiconductor. Yet another application would be in determining the chemical composition of a series of distinct organic molecules in a polymer chain, which could lead to a method of reading the sequence of a single DNA molecule.

Figure 1:
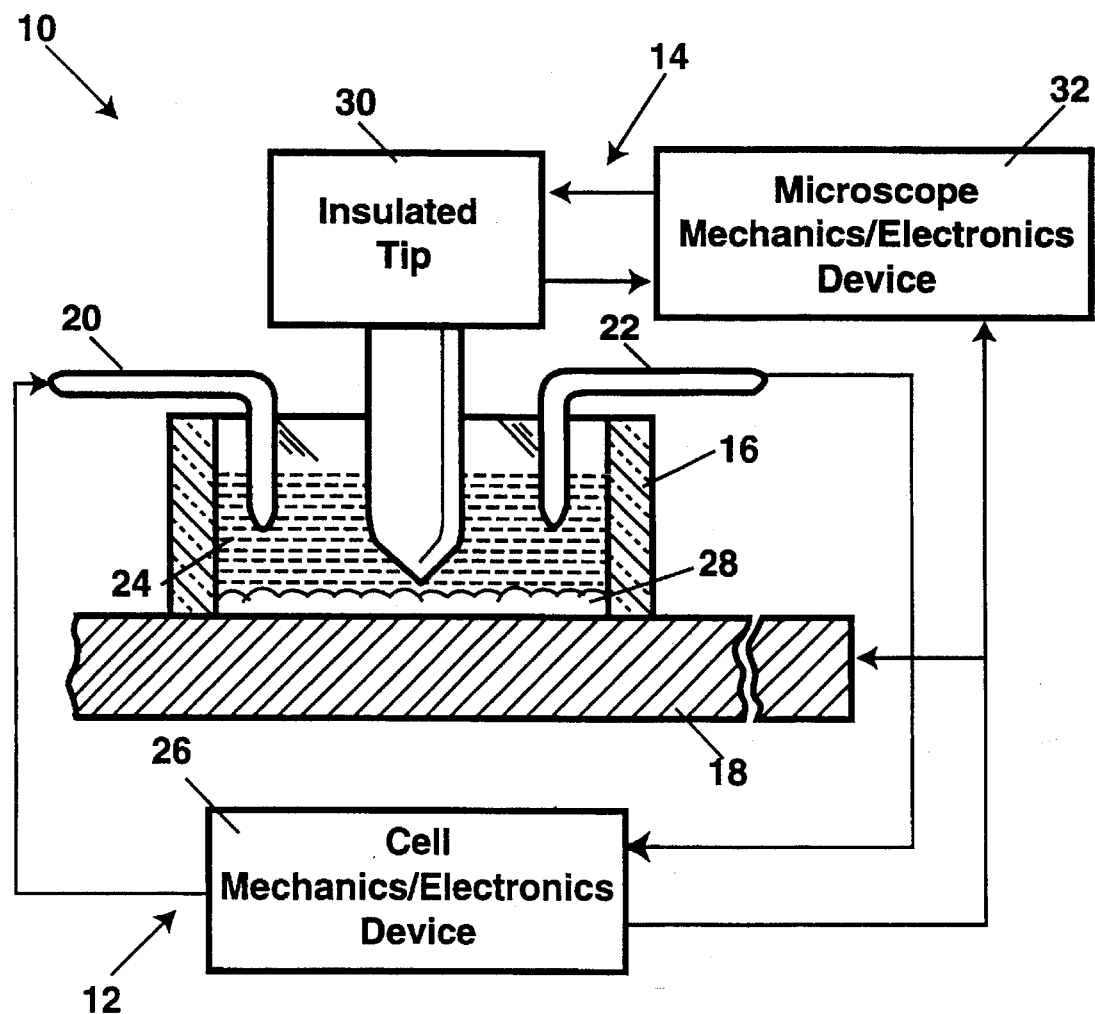
FIG. 1 is a cross sectional and schematic representation of an electrochemical cell, including a conducting substrate on which voltage potentials can be applied, and an insulated tip portion of an associated scanning tunneling microscope suitable for carrying out the method according to the present invention.

Referring then to FIG. 1, a cross sectional and schematic representation of an electrochemical/microscope apparatus 10 suitable for carrying out the method according to the present, and, ostensibly, the above-mentioned chemical sensing applications thereof is shown. The electrochemical/microscope apparatus 10 comprises an electrochemical cell 12 and a scanning tunneling microscope 14. The electrochemical cell 12 comprises a glass tube cell 16 sealably affixed to a conducting substrate 18. A counter electrode 20 and a reference electrode 22 are each operatively disposed within the glass tube cell 16 and in an electrolytic solution 24 contained therein. The electrolytic solution 24 has been premixed with the organic molecules (not shown) to be detected and identified. The aforementioned conducting substrate 18, counter electrode 20, and reference electrode 22 are operatively connected to a cell mechanics/electronics device 26 for applying, inter alia, voltage potentials thereto. Upon the proper application of the voltage potentials, an organic molecule monolayer(s) 28 is adsorbed upon the conducting substrate 18. Continuing, the scanning tunneling microscope 14 comprises an insulated tip 30 and a microscope mechanics/electronics device 32, which are operatively connected to each other and to the organic molecule monolayer(s) 28 for generating a photomicrographic image thereof, according to the present method. An electrochemical cell and scanning tunneling microscope setup suitable (after being modified as taught and disclosed herein) for performing the method of the present invention appears in U.S. Pat. No. 4,868,396 by Lindsay, entitled "Cell and Substrate for Electrochemical STM Studies," filed on Oct. 13, 1987, and issued on Sep. 19, 1989. The teachings, where appropriate, of the foregoing Patent by Lindsay are incorporated herein by reference.

STATEMENT OF THE OPERATION

Still referring to FIG. 1, and as previously mentioned, the method of the present invention is predicated on the unexpected result that the contrast of photomicrographic images generated by scanning of the surface of the conducting substrate 18 of the electrochemical cell 12 with the insulated tip 30 and the microscope mechanics/electronics device 32 of the scanning tunneling microscope 14 are remarkably sensitive to the changes in the voltage potentials from the cell mechanics/electronics device 26 of the electrochemical cell 12 on the surface of the conducting substrate 18 thereof. Consequently, the electrochemical ability to detect/identify a plurality of organic molecules is extended to a single molecule by the combination of electrochemical and scanning tunneling microscopy techniques.

Still yet referring to FIG. 1, the method, e.g., using gold as the conducting substrate 18, is initiated by preparing a solution of the various organic molecules to be detected/identified. The solution consists of an appropriate concentration of the organic molecules in a supporting electrolyte to form the electrolytic solution 24. Dense layers of organic molecules form stable adsorbate layers on noble metal surfaces when a simple non-adsorbing electrolyte such as sodium perchlorate ($NaClO_4$) is used. To image DNA molecules, however, an electrolyte such as sodium dihydrogen phosphate-sodium hydrogen diphosphate ($NaH_2PO_4$—$NaH(PO_4)_2$] that will also adsorb onto the surface of the conducting substrate 18 (of gold) is used. This electrolyte assists the DNA molecules, which are not strongly adsorbed, to be better adsorbed. The necessity, and, accordingly, the reason for the foregoing is that the DNA molecules are negatively charged, which makes it extremely difficult for them to be adsorbed onto metal surfaces which are intrinsically negatively charged and, as such, repel the DNA molecules. The preparation of DNA molecules for imaging with a scanning tunneling microscope is disclosed in U.S. Pat. No. 5,155,361 by Lindsay, entitled "Potentiostatic Preparation of Molecular Adsorbates for Scanning Probe Microscopy," filed on Jul. 26, 1991, and issued on Oct. 13, 1992. The teachings, where appropriate, of the foregoing Patent by Lindsay are incorporated herein by reference. As taught therein the electrolytic solution 24 should be cleaned of any free contamination that would react with a noble metal substrate. Also, if the maximum voltage potential sweep range of the scanning tunneling microscope is to be used, the electrolytic solution 24 should be degassed by pulling a vacuum over it and then maintaining it in an inert gas, e.g., an argon environment, until needed. The concentration level of the organic molecules to be detected/identified depends upon the nature of the adsorption process. For example, hydrophobic organic molecules such as the DNA bases will form a monolayer on the surface of the conducting substrate 18 (of gold) even if the overall concentration is such that the total number of organic molecules in the electrolytic solution 24 is adequate to form only a few monolayers. Hydrophilic organic molecules, however, such as DNA may have to be added in large excess, e.g., tens of micrograms per milliliter of solution, in order for adequate adsorption to take place.

To continue and still referring to FIG. 1, the electrolytic solution 24 is loaded within the glass tube cell 16 so as to completely cover the surface of the conducting substrate 18 (of gold) of the electrochemical cell 12 as shown. For purposes of the present invention, the conducting substrate 18 (of gold) is grown epitaxially on heated mica in an ultrahigh vacuum and then stored under an inert gas such as argon until needed. The conducting substrate 18 (of gold) forms Au(111) facets which are atomically flat over micron dimensions. A conducting substrate 18 (of graphite) is also used to carry out the method of the present invention. (See Example 2 hereintofollow.) The conducting substrate 18 (of graphite) is fashioned of freshly cleaved highly oriented pyrolytic graphite. For purposes of the present invention, the counter electrode 20 is a platinum wire and the reference electrode 22 is a gold or silver wire that has been oxidized in the supporting electrolyte of the electrolytic solution 24. When the conducting substrate 18 is graphite, the supporting electrolyte is sodium chloride (NaCl). In cooperation with the mechanics/electronics device 26, the voltage potential scale to be used is calibrated with respect to a standard electrode (not shown) such as a silver/silver chloride (AgCl) or a saturated calomel electrode (SCE). The calibration is accomplished by cyclic voltammetry using an electrolytic solution 24 of known composition disposed in the glass tube cell 16 of the electrochemical cell 12. In order for the calibration to be accomplished, in addition to the counter electrode 20 and the reference electrode 22, the standard electrode is disposed in the aforementioned electrolytic solution 24 of known composition. The scale that is created from this calibration is termed the SCE scale and will be used to define the voltage potentials used in the examples below.

The following examples are illustrative of the method of the present invention wherein the combination of electrochemical and scanning tunneling microscopy techniques are used, concurrently, to detect/identify a single organic molecule. These examples are not intended to limit the scope of present invention.

EXAMPLES

As shown in FIG. 1, the electrochemical cell 12 is disposed under the scanning tunneling microscope 14, which uses its insulated tip 30, in combination with its microscope mechanics/electronics device 32, to scan the surface of the conducting substrate 18, and, accordingly, the organic molecule monolayer(s) 28 so as to generate photomicrographic images thereof. As previously mentioned, the glass tube cell 16 of the electrochemical cell 12 is loaded with the electrolytic solution 24 which consists of the organic molecules to be detected/identified and the appropriate electrolyte. In setting up the electrochemical/microscope 10 to carry out the method according to the present invention, a negative voltage potential generated from the cell mechanics/electronics device 26 which is operatively connected to the conducting substrate 18 is found such that none of the organic molecules in the electrolytic solution 24 are adsorbed onto the surface of the conducting substrate 18. This negative voltage potential is termed ($E_{LOW}$). Next, the voltage potential on the surface of the conducting substrate 18 is made more positive until the organic molecules are adsorbed thereon. Concurrently as the voltage potential on the surface of the conducting substrate 18 is made more positive, the scanning tunneling microscope 14, in cooperation with its insulated tip 30 and its microscope mechanics/electronics device 32, is caused to scan the surface of the conducting substrate 18, and, accordingly, the organic molecule monolayer(s) 28, such that a series of photomicrographic images are generated, with increased contrast, as the voltage potential on the surface of the conducting substrate 18 is made more positive. Eventually, as the voltage potential on the surface of the conducting substrate 18 is made even more positive, oxidation reactions will set in on the surface of the conducting substrate 18, and, consequently, the photomicrographic images will become unstable. The positive voltage potential at which this occurs is termed ($E_{HIGH}$). Thus, the photomicrographic images generated within the voltage potential range of $E_{LOW}$ and $E_{HIGH}$ can be used for detecting/identifying a single one of the series of organic molecules by observing the changes in the contrast of the photomicrographic images. The voltage potential range is termed the "fingerprint", i.e., the useful voltage potential range in which the organic molecules can be reliably detected/identified. Examples 1, 2, and 3 follow below.

EXAMPLE 1

Figure 2:
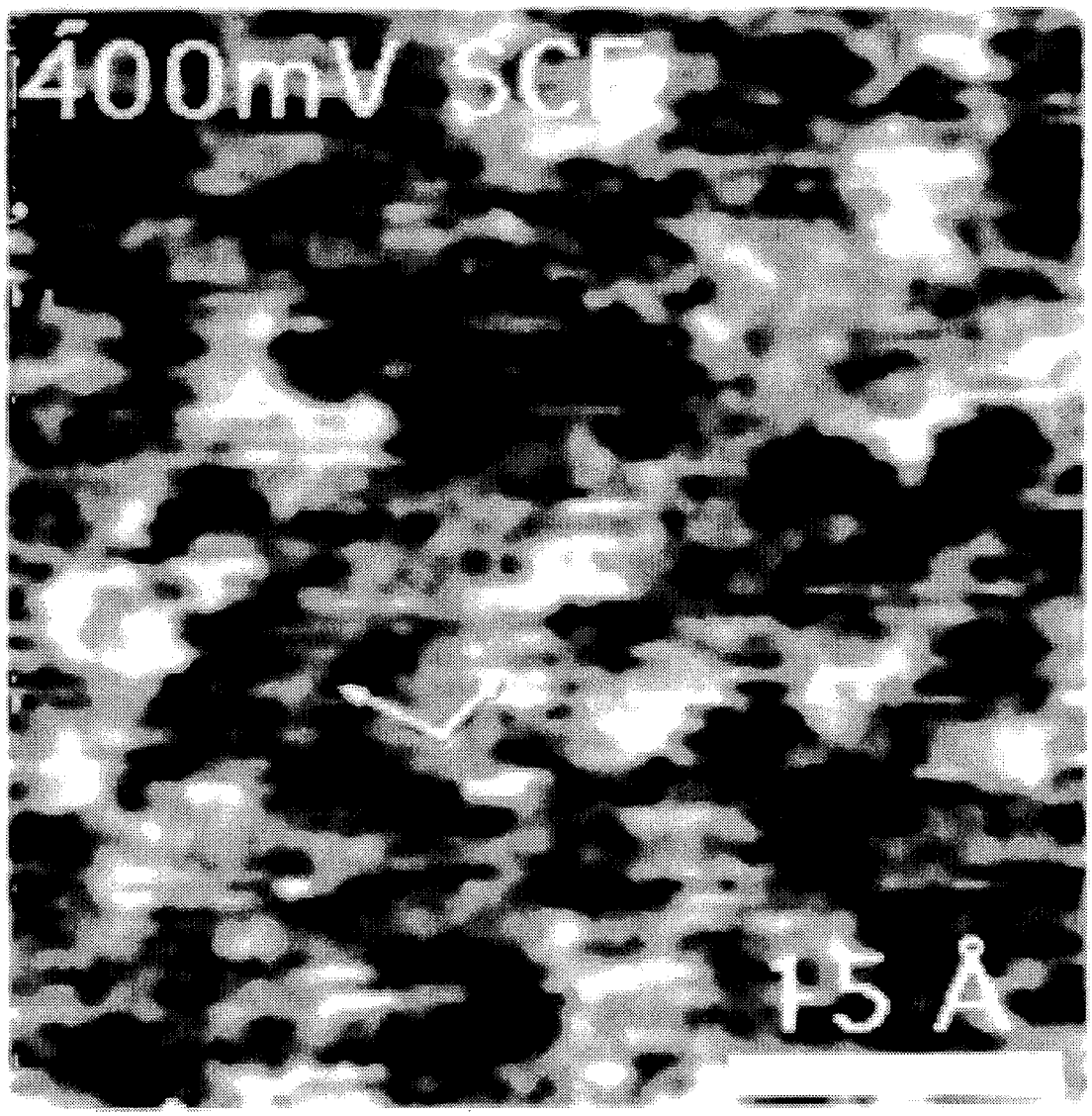
FIG. 2 is a photomicrographic image of thymine adsorbed on the conducting substrate of FIG. 1, which in this case is gold [Au(111)], the photomicrographic image being generated by scanning of the conducting substrate and the adsorbed thymine with the insulated tip portion of the associated scanning tunneling microscope of FIG. 1 and concurrently with the application of a voltage potential of 400 mV SCE on the conducting substrate, according to the method of the present invention.

Thymine on Au(111): Referring to FIGS. 1 and 2 as viewed concurrently, no photomicrographic image is generated until the voltage potential applied to the conducting substrate 18 (of gold) reaches 400 mV SCE. Then, the thymine molecules are adsorbed to form the organic molecule monolayer(s) 28 having an oblique lattice with lattice constants of a=6.5 Å, b=7.1 Å and a tilt angle, $\gamma=105°$. As the voltage potential is increased, the contrast continually improves until the photomicrographic image becomes unstable at 640 mV SCE, i.e., $E_{HIGH}$ for the thymine molecules. The contrast is decreased as the voltage potential applied to the conducting substrate 18 (of gold) is lowered. On this return cycle, a photomicrographic image is obtained down to a voltage potential of 240 mV SCE. Also during the return cycle, the characteristic corrugation at a voltage potential of 300 mV SCE is 0.1±0.05 Å.

EXAMPLE 2

Figure 3:
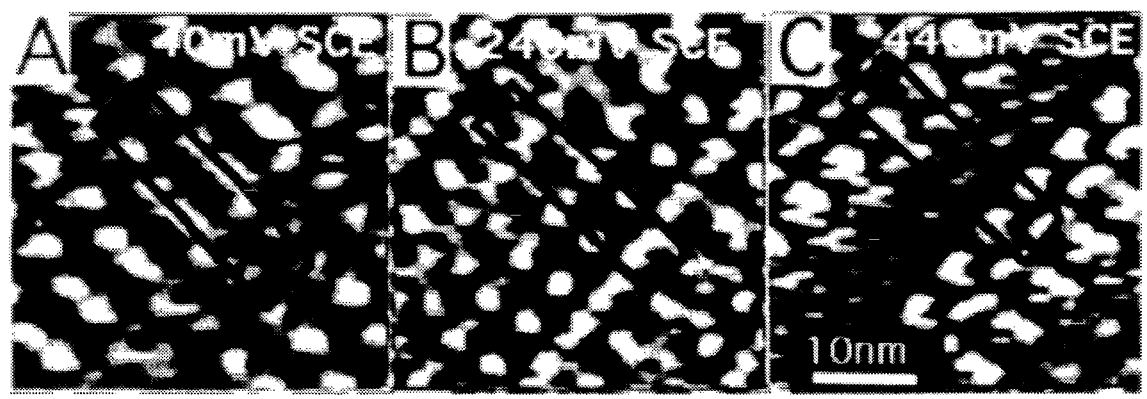
FIG. 3 shows three photomicrographic images (A,B,C) of guanine adsorbed on the conducting substrate of FIG. 1, which in this case is graphite, the photomicrographic images being generated by scanning of the conducting substrate and the adsorbed guanine with the insulated tip portion of the associated scanning tunneling microscope of FIG. 1 and concurrently with the application of the SCE voltage potentials 40 mV, 240 mV, and 440 mV, respectively on the conducting substrate, according to the method of the present invention.

Guanine on graphite: Referring to FIGS. 1 and 3 as viewed concurrently, three stable photomicrographic images A, B, and C are generated within the voltage potential range of −250 mV and +580 mV SCE, i.e., $E_{LOW}$ and $E_{HIGH}$, respectively, for the guanine molecules. The guanine molecules form a rectangular lattice, on the conducting substrate 18 (of graphite), with a=8.5 Å and b=11.5 Å. The photomicrographic images A, B, and C are dramatic changes at the voltage potentials that are characteristic of the guanine molecules. Below the voltage potential of 230 mV SCE, the guanine molecules appear as distinct "blobs". (image A) At the voltage potential of 230 mV SCE, the photomicrographic image is transformed so that the guanine molecules appear to coalesce into long rows. (image B) These rows are transformed back to distinct "blobs" at the voltage potential of +430 mV SCE. (image C)

EXAMPLE 3

Figure 4:
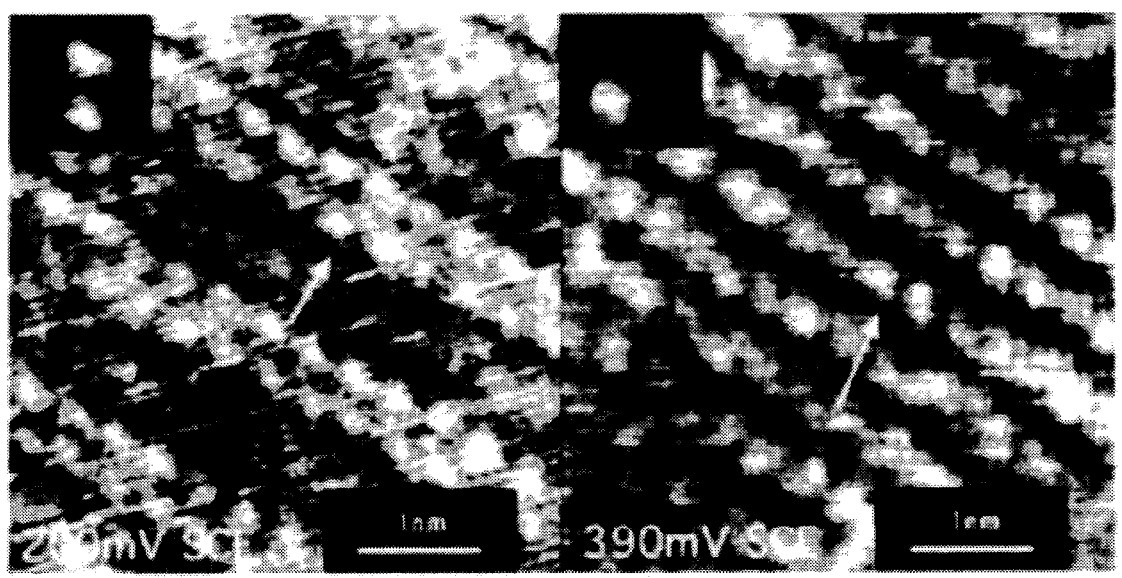
FIG. 4 shows two photomicrographic images of cytosine adsorbed on the conducting substrate of FIG. 1, which in this case is also gold [Au(111)], the photomicrographic images being generated by scanning of the conducting substrate and the adsorbed gold with the insulated tip portion of the associated scanning tunneling microscope of FIG. 1 and concurrently with the application of the SCE voltage potentials 200 mV and 390 mV, respectively on the conducting substrate, according to the method of the present invention.

Cytosine on Au(111): Referring to FIGS. 1 and 4 as viewed concurrently, cytosine molecules are adsorbed onto the surface of the conducting substrate 18 (of gold) at voltage potentials above 250 mV SCE, and will yield a stable photomicrographic image up to the voltage potential of 740 mV SCE, i.e., $E_{HIGH}$ for the cytosine molecules. At low potentials, two geometries are seen for the cytosine molecules. One geometry is a planar structure. This is manifested as an oblique lattice with a=10.5 Å, b=9.5 Å and the tilt angle, $\gamma=102°$. The other geometry is a structure in which the cytosine molecules stack onto each other to form polymeric strands, which are manifested in rows in which the features along a strand are separated by 3.76 Å. The planar structure is maintained over the entire range of voltage potentials. The stacked structure, shown in the left photomicrograph off FIG. 4 at 200 mV SCE, undergoes a dramatic transition at the voltage potential of 380 mV SCE where it is transformed into a planar structure shown in the right photomicrograph of FIG. 4 at 390 mV SCE.

The foregoing examples illustrate that for each of the organic molecules (thymine, guanine, and cytosine), there is a characteristic electrochemically-induced change of pattern in its photomicrographic image as a function of its conducting substrate voltage potentials. Moreover, each of the organic molecules also undergoes a characteristic and repeatable change in the contrast of its photomicrographic image as a function of its conducting substrate voltage potentials.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. An improved method of detecting/identifying organic molecules, in situ, using electrochemistry and scanning tunneling microscopy concurrently, comprising the steps of:

adsorbing said organic molecules onto the surface of a conducting substrate to form a monolayer(s) of adsorbed organic molecules by adjusting and then holding the surface of said conducting substrate to an overall predetermined voltage potential for a predetermined time;

increasing the voltage potential on the surface of said conducting substrate from the overall predetermined voltage potential until an electrochemically-induced change characteristic of said adsorbed organic molecules occurs therein, thereby permitting detection/identification thereof; and generating concurrently with increasing the voltage potential of the surface of said conducting substrate, by a scanning tunneling microscope in cooperation with an electrochemical cell, photomicrographic images, to a resolution of a single one of said adsorbed organic molecules, the contrast of the photomicrographic images being sensitive to the electrochemically-induced change, and, thus, also being characteristic of said adsorbed organic molecules, thereby extending the detection/identification to a single one thereof.

2. The improved method of claim 1 comprising the additional steps of:

preparing an electrolytic solution including an electrolyte and said organic molecules; and loading said electrolytic solution into said electrochemical cell so as to completely submerge the surface of said conducting substrate.

3. The improved method of claim 2 wherein coverage of the surface of said conducting substrate with said absorbed organic molecules is controlled by adjusting the concentration thereof in said electrolytic solution.

4. The improved method of claim 2 comprising the additional step of disposing an insulated tip of said scanning tunneling microscope into said electrolytic solution near the surface of said conducting substrate so as to scan said adsorbed organic molecules and generate the photomicrographic images thereof.

5. The improved method of claim 2 wherein said electrolyte of said electrolytic solution is sodium perchlorate ($NaClO_4$) and said organic molecules thereof are thymine.

6. The improved method of claim 5 wherein said organic molecules are cytosine.

7. The improved method of claim 2 wherein said electrolyte of said electrolytic solution is sodium chloride (NaCl) and said organic molecules thereof are guanine.

8. The improved method of claim 1 wherein said conducting substrate is gold.

9. The improved method of claim 1 wherein said conducting substrate is graphite.

10. The improved method of claim 1 wherein said organic molecules are adsorbed onto the surface of said conducting substrate when the an overall positive voltage potential is within a range of $E_{LOW}$ and $E_{HIGH}$.

11. The improved method of claim 1 wherein the predetermined time for said organic molecules to be adsorbed onto the surface of said conducting substrate is less than one second.

12. A method of detecting organic molecules and identifying the chemical species of the organic molecules, in situ, using electrochemistry and scanning tunneling microscopy concurrently, comprising the steps of:

preparing an electrolytic solution including an electrolyte and the organic molecules to be detected and identified;

loading the electrolytic solution into an electrochemical cell so as to submerge the surface of a conducting substrate;

disposing the insulated tip of a scanning tunneling microscope in the electrolytic solution near the surface of the conducting substrate so as to scan the substrate surface, including any organic molecules adsorbed onto the substrate surface;

adjusting the substrate voltage potential to a first voltage potential at which the organic molecules are adsorbed into the substrate surface and form a layer of the organic molecules on the substrate surface;

varying the substrate voltage potential until at least one electrochemically-induced change characteristic of the adsorbed organic molecules occurs therein, thereby permitting the detection and chemical identification thereof; and concurrently with the step of varying the substrate voltage potential, generating photomicrographic images by the scanning tunneling microscope to a resolution of a single one of the adsorbed organic molecules, the contrast of the photomicrographic images being sensitive to the at least one electrochemically-induced change, and thus, also being characteristic of the adsorbed organic molecules, thereby extending the detection and chemical identification to a single one of the adsorbed organic molecules.

13. The method of claim 12, wherein the step of adjusting the substrate voltage potential to the first voltage potential at which the organic molecules are adsorbed into the substrate surface comprises:

applying an initial negative voltage potential to the conducting substrate at which none of the organic molecules in the electrolytic solution are adsorbed onto the surface of the conducting substrate;

raising the substrate voltage potential, I. e., making the substrate voltage potential more positive, until the organic molecules are adsorbed onto the substrate surface at said first voltage potential; and concurrently with the step of raising the substrate voltage potential, generating photomicrographic images by the scanning tunneling microscope to a resolution of a single one of the adsorbed organic molecules.

14. The method of claim 13, wherein the step of varying the substrate voltage potential comprises:

raising the voltage until the photomicrographic images being generated concurrently by the scanning tunneling microscope termed $E_{HIGH}$, become unstable, the substrate voltage at which this occurs being 15. The method of claim 14, wherein the step of varying the substrate voltage potential further comprises:

lowering the substrate voltage potential from $E_{HIGH}$ to a substrate voltage at which no photomicrographic image of organic molecules adsorbed onto the substrate surface is generated by the scanning tunneling microscope.

\* \* \* \* \*